United States Patent
Urmosi

(10) Patent No.: US 9,533,571 B1
(45) Date of Patent: Jan. 3, 2017

(54) FINGER-OPERATED LEVER DEVICE TO BE INSTALLED ON A VEHICLE HANDLEBAR FOR ACTUATING A CABLE OF A VEHICLE

(71) Applicant: Robert Istvan Urmosi, Orlando, FL (US)

(72) Inventor: Robert Istvan Urmosi, Orlando, FL (US)

( * ) Notice: Subject to any disclaimer, the term of this patent is extended or adjusted under 35 U.S.C. 154(b) by 0 days.

(21) Appl. No.: 14/596,341

(22) Filed: Jan. 14, 2015

Related U.S. Application Data

(60) Provisional application No. 61/929,365, filed on Jan. 20, 2014.

(51) Int. Cl.
  *G05G 1/04* (2006.01)
  *B60K 26/02* (2006.01)

(52) U.S. Cl.
  CPC ......... *B60K 26/02* (2013.01); *B60K 2026/026* (2013.01)

(58) Field of Classification Search
  CPC ... B60K 26/02; B60K 2026/026; B62K 23/06; B62M 25/04
  USPC .......................................................... 74/522
  See application file for complete search history.

(56) References Cited

U.S. PATENT DOCUMENTS

| | | | | |
|---|---|---|---|---|
| 3,987,687 A | * | 10/1976 | Bland | B60K 26/02 74/519 |
| 7,735,392 B2 | * | 6/2010 | Poulos, Jr. | B62K 23/04 74/502.2 |
| 8,082,819 B2 | * | 12/2011 | Case | B62K 23/06 74/489 |
| 8,967,117 B2 | * | 3/2015 | Manjunath | F02D 11/04 123/400 |
| 2002/0088125 A1 | * | 7/2002 | Kobayashi | A01D 34/90 30/276 |
| 2008/0098848 A1 | * | 5/2008 | Dal Pra' | B62K 23/06 74/502.2 |

* cited by examiner

*Primary Examiner* — Vicky Johnson
(74) *Attorney, Agent, or Firm* — H. John Rizvi; Gold & Rizvi, P.A.

(57) ABSTRACT

A finger-operated lever device to be installed on a handlebar of an All-Terrain Vehicle (ATV) or other applicable vehicle, for actuating a cable to cause acceleration of the internal combustion engine of the vehicle. The lever device includes a housing, an internal first lever assembly connectable to the cable, and an external second lever assembly. The external lever assembly and the internal lever assembly are connected so that user operation of the external lever assembly causes the internal lever assembly to rotate. The external lever assembly is divided into two portions, a support member and an extension member. The extension member can be adjusted at different angles to the support member, allowing the user to set the angle of the lever to most comfortably fit to his or her riding posture.

19 Claims, 9 Drawing Sheets

FINGER-OPERATED LEVER DEVICE TO BE INSTALLED ON A VEHICLE HANDLEBAR FOR ACTUATING A CABLE OF A VEHICLE

CROSS-REFERENCE TO RELATED APPLICATIONS

This application claims the benefit of U.S. Provisional Patent Application Ser. No. 61/929,365, filed Jan. 20, 2014, which is incorporated herein in its entirety.

FIELD OF THE INVENTION

The present invention relates to a finger-operated lever device to be installed on a vehicle handlebar for actuating a cable of a vehicle, and particularly to a thumb throttle device designed to be installed on an ATV handlebar for accelerating and decelerating an All-Terrain Vehicle (ATV), where the position of the lever is adjustable so that the thumb can comfortably and safely access the lever regardless of the posture in which the user is riding the vehicle and gripping the handlebar.

BACKGROUND OF THE INVENTION

An All-Terrain Vehicle (ATV) is an open three-wheeled or four-wheeled vehicle that includes a seat and a steering handlebar, and that is designed for driving over very irregular terrain while also being capable of driving over asphalt. The experience of riding an ATV is unique for several reasons. In the first place, handlebar steering provides a very sportive driving experience, similar to that of driving a motorcycle or a mountain bike (MTB), but different in that the vehicle has three or four wheels instead of two. In the second place, the driver generally rides in a straddled position, further enhancing the sportive driving feeling. In addition, the driver can ride the ATV either sitting down or standing up, depending on the type of terrain or on his/her specific desire at any given moment. ATV's are thus versatile vehicles that provide many riding styles, although the use for which they are especially designed is to ride over rough terrain.

ATV's are usually provided with an internal combustion engine to power the vehicle and cause it to move. Such a combustion engine generally comprises one or more cylinders, inside each of which there is a combustion chamber and a movable piston. Internal combustion engines work in cycles. In each cycle, a mixture of fuel and air is injected into the combustion chamber; then, the piston moves towards the chamber and compresses the injected mixture; the fuel explodes (a spark can be provided therefor), causing the piston to move outwards from the combustion chamber. A crank shank converts the longitudinal outward and inward movement of the pistons into a rotational movement that is eventually transmitted to the tractor wheels. The combustion engine further includes a throttle valve or other valve capable of adjusting the amount of fuel or air in the mixture. Adjusting the amount of fuel or air in the mixture causes the motor to accelerate or decelerate, depending on whether the fuel/air ratio is increased or decreased. A user-operable mechanism, external to the engine, allows the user to act on the valve in order to accelerate or decelerate the motor. Normally, the user-operable mechanism for accelerating an ATV is included in the handlebar, in further resemblance to motorcycles, and is connected to the throttle valve or other applicable fuel-, air- or mixture-regulating valve by a cable.

Various types of user-operable handlebar accelerating mechanisms are known in ATV's present in the market. For instance, the user-operable mechanism can consist of a turnable gripping portion capable of pulling the aforementioned cable. The turnable gripping portion is usually on the right side of the handlebar so that the user can accelerate or decelerate the vehicle by rotating the gripping portion using his/her right hand. Although traditionally used in motorcycles, mechanisms based on a turnable gripping portion can result quite uncomfortable to use in ATV's, particularly when the user is standing up, as they force the user's wrist to flex upwards excessively in order to accelerate the vehicle. Alternatively, the user-operable handlebar mechanism can consist of a lever that is actuated by the user's thumb and that is capable of pulling the aforementioned cable. Such a mechanism is sometimes referred to as thumb throttle. Thumb throttles are advantageous in that they require less or no movement of the user's wrist. However, they present the drawback of the user having to slightly ungrasp the handle to allow for his/her thumb to press the lever. Because of this, thumb throttles can be uncomfortable and even dangerous to use, especially when riding in a standing position, and particularly when performing a riding modality known as ATV Cross. In said modality, the user performs jumps with the ATV, and thus needs to strongly hold on to the handlebar in order not to fall off of the vehicle; in such riding conditions, having to soften the grip in order to press the thumb lever can result very dangerous and even fatal.

Accordingly, there remains a need in the art to provide a safe and comfortable user-operable handlebar mechanism for actuating a cable, such as a cable for operating a throttle valve for accelerating an ATV or other vehicle provided with an internal combustion engine.

SUMMARY OF THE INVENTION

The present invention overcomes the deficiencies of the known art and the problems that remain unsolved by providing a finger-operated lever device to be installed on a vehicle handlebar for actuating a cable of the vehicle. For instance, the finger-operated lever device can be installed on a handlebar of an All-Terrain Vehicle (ATV) in order to actuate on the cable that in turn actuates the throttle valve of the internal combustion engine. The device of the present invention provides comfortable access to the user's thumb or finger by including a finger-operable lever whose position within the device can be varied, allowing the user to adjust the position of the lever to a position that best suits the posture in which the user is riding the ATV, so that the lever is easy and safe to operate regardless of the user's posture.

In accordance with one embodiment of the present invention, the invention consists of a finger-operated lever device to be installed on a vehicle handlebar for actuating a cable of a vehicle, comprising:

a housing, comprising a handlebar-receiving area for at least partially embracing a portion of the handlebar, an inner space delimited inside the housing, and a cable opening for allowing a cable to pass between the inner space and the outside of the housing;

a first lever assembly, arranged in the inner space of the housing, the first lever assembly comprising a hinged end and a pivotable end, the hinged end being hinged along a first rotation axis, and the pivotable end providing a fastening area for connecting a cable;

a second lever assembly, arranged at least partially outside of the housing and extending from the housing so that a user can operate the second lever assembly with at least one finger, wherein the second lever assembly is non-rotationally connectable to the hinged end of the first lever assembly.

In a second aspect, the lever device further includes a rod extending from the second lever assembly to the hinged end of the first lever assembly, and rotationally coupled to the second lever assembly and to the hinged end so that the first lever assembly, the rod and the second lever assembly are jointly rotatable about the first rotation axis, wherein the rod extends through a through hole in the housing.

In another aspect, through hole is provided with at least one bearing to facilitate rotation of the rod within the through hole in the housing. The at least one bearing can include a needle bearing.

In another aspect, the second lever assembly includes a support member and an extension member, the support member being non-rotationally connectable to the hinged end of the first lever assembly, wherein the extension member protrudes outwardly from the housing allowing for the extension member to be operated by a user's finger, the extension member being rotatable relative to the support member about a second rotation axis, wherein the extension member is lockable to the support member in different rotational positions.

In another aspect, the second rotation axis is parallel to the first rotation axis.

In another aspect, the extension member comprises an extension body portion and an extending handle, the extension body portion facing the support member and comprising at least two pin-receiving spaces capable of becoming alternately aligned with a pin-receiving space of the support member, the second lever assembly further comprising a pin arrangeable within the pin-receiving space of the support member and within a pin-receiving space of the extension body portion, preventing rotation of the extension member with respect to the support member.

In another aspect, the pin-receiving spaces of the extension body portion comprise longitudinal cylindrical grooves on an outer surface of the extension body portion, and the pin-receiving space of the support member comprises a longitudinal cylindrical groove on an outer surface of the support member.

In another aspect, the extension body portion is movable with respect to the support member in the direction of the second rotation axis, and the extension body portion is spring biased against the support member so that the pin-receiving spaces of the extension body portion are biased to radially face the pin-receiving space of the support member.

In another aspect, the extension body portion comprises a longitudinal through hole forming a barrel hinge connection with a rod longitudinally coupled to the support member.

In another aspect, the rod is threaded to the support member.

In another aspect, the rod is terminated in a shoulder, the shoulder comprising an inner surface and an outer surface, the extension body portion including a compression spring housed in the longitudinal through hole of the extension body portion and applying a longitudinal expansion force between the inner surface of the shoulder and an opposing inner surface of the extension body portion.

In another aspect, the lever device further comprises a rod extending from the support member to the hinged end of the first lever assembly, and rotationally coupled to the support member and to the hinged end so that the first lever assembly, the rod and the support member of the second lever assembly are jointly rotatable around the first rotation axis.

In another aspect, the support member is rotationally and longitudinally coupled to the rod by at least one transverse screw, allowing the support member to be adjusted and locked to the rod in different rotational and/or longitudinal positions.

In accordance with another embodiment of the present invention, the invention consists of a finger-operable lever device to be installed on a vehicle handlebar for actuating a cable of a vehicle, comprising:

a housing, comprising a handlebar-receiving area for at least partially embracing a portion of the handlebar, an inner space delimited inside the housing, and a cable opening for allowing a cable to pass between the inner space and the outside of the housing;

a first lever assembly, arranged in the inner space of the housing, the first lever assembly comprising a hinged end and a pivotable end, the hinged end being hinged about a first rotation axis, and the second end providing a fastening area for connecting a cable;

a second lever assembly, arranged at least partially outside of the housing, wherein the second lever assembly comprises a support member and an extension member, the support member being non-rotationally connectable to the hinged end of the first lever assembly, and wherein the extension member protrudes outwardly from the housing allowing for the extension member to be operated by a user's finger, the extension member being rotatable relative to the support member about a second rotation axis, wherein the extension member is lockable to the support member in different rotational positions.

Introducing yet another embodiment of the invention, the present invention consists of a finger-operated lever device to be installed on a vehicle handlebar for actuating a cable of a vehicle, comprising:

a housing, comprising a handlebar-receiving area for at least partially embracing a portion of the handlebar, an inner space delimited inside the housing, and a cable opening for allowing a cable to pass between the inner space and the outside of the housing;

a first lever assembly, arranged in the inner space of the housing, the first lever assembly comprising a hinged end and a pivotable end, the hinged end being hinged along a first rotation axis, and the second end providing a fastening area for connecting a cable;

a second lever assembly, arranged at least partially outside of the housing, wherein the second lever assembly comprises a support member and an extension member, the support member being non-rotationally connectable to the hinged end of the first lever assembly, and wherein the extension member protrudes outwardly from the housing allowing for the extension member to be operated by a user's finger, the extension member being rotatable relative to the support member about a second rotation axis, wherein the extension member is lockable to the support member in different rotational positions; and a rod extending from the second lever assembly to the hinged end of the first lever assembly, and non-rotationally coupled to the support member of the second lever assembly and to the hinged end so that the first lever assembly, the rod and the second lever assembly are jointly rotatable about the first rotation axis, wherein the rod extends through a through hole in the housing.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
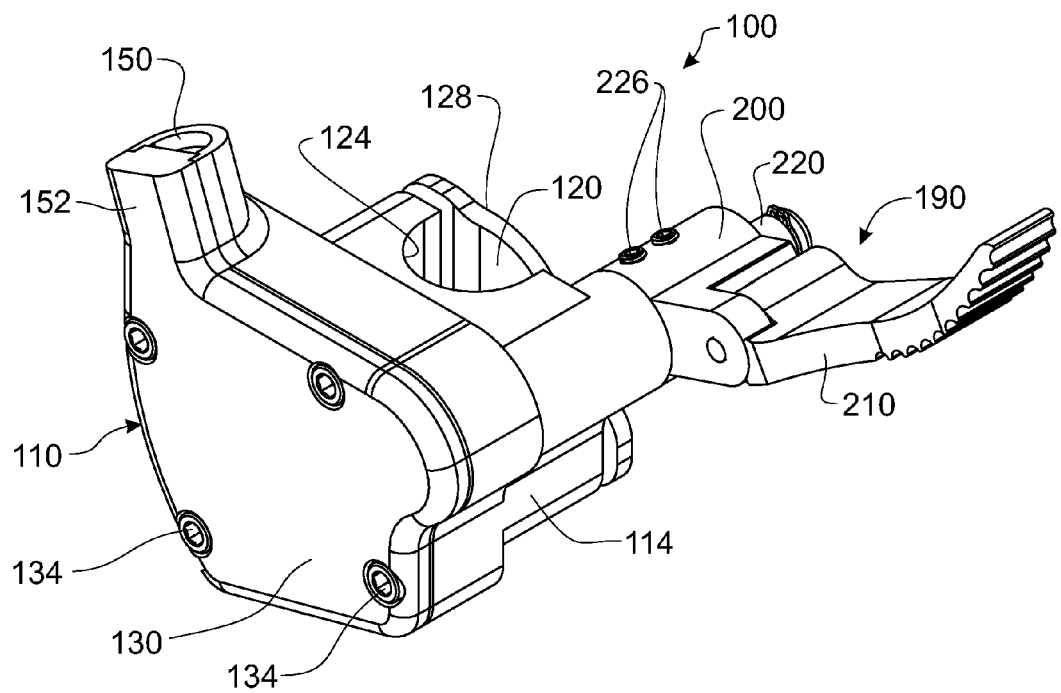
FIG. 1 presents a first perspective view of an exemplary lever device according to the invention.
Figure 2:
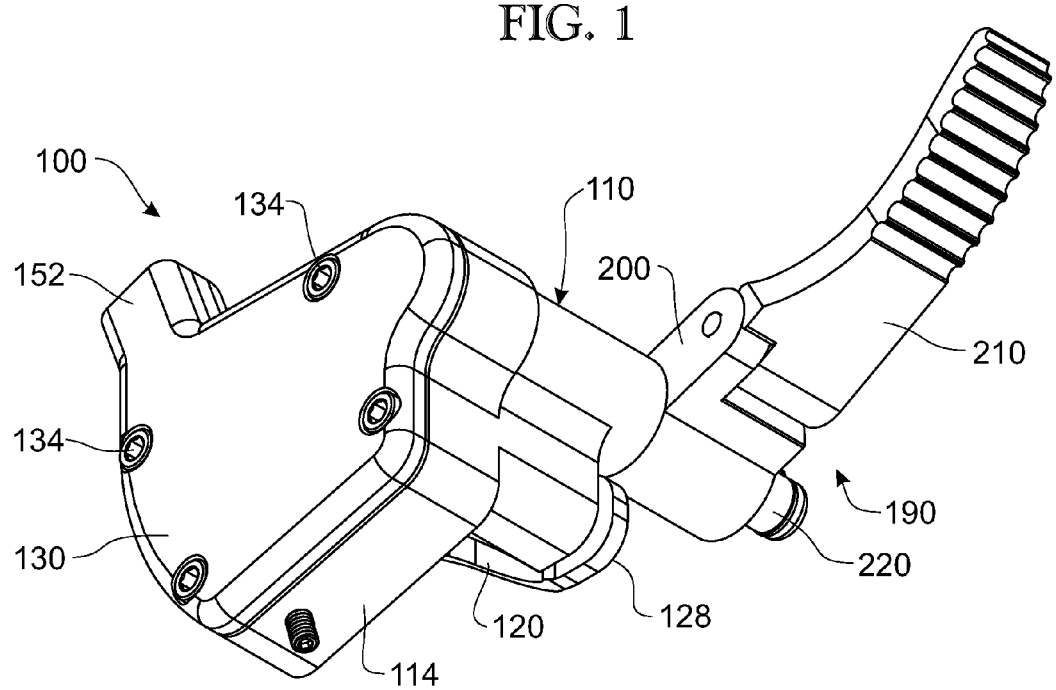
FIG. 2 presents a second perspective view of the lever device of the previous figure.

The illustrations of FIGS. 1 and 2 show two different perspective views of an exemplary embodiment of the invention, consisting of a finger-operated lever device 100 for pulling or releasing a cable that actuates a throttle valve or other similar mechanism for accelerating a combustion engine of an ATV. The cable is not shown in the figures.

Figure 3:
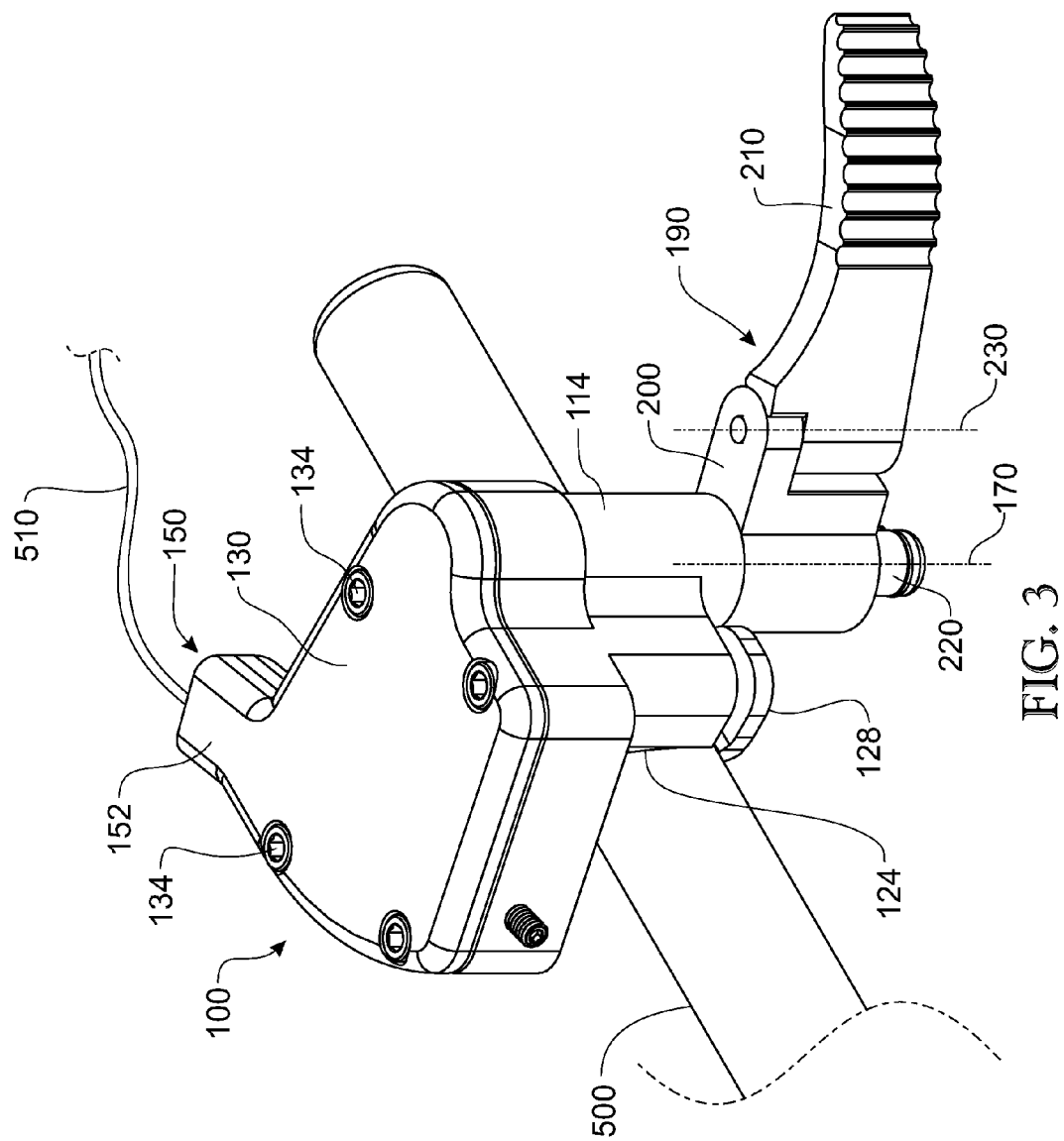
FIG. 3 presents the lever device of FIG. 1 mounted on a vehicle handlebar.

The lever device 100 consists mainly of a housing 110 inside which many of the lever device components are housed and concealed. The housing 110 includes a handlebar-receiving area 120, for receiving the ATV handlebar, not shown. In the present embodiment, the handlebar-receiving area 120 is a through hole delimited by a concave surface 124 comprised in a main body 114 of the housing 110 and by a separable cover 128 that fastens to the main body 114. The illustration of FIG. 3 shows the lever device 100 attached to a handlebar 500 by having fitted the handlebar 500 against the concave surface 124 and by having fastened the separable cover 128 onto the main body 114 of the housing 110 so that the separable cover 128 keeps the handlebar 500 in place. Therefore, the device 100 of the present embodiment fully embraces the perimeter of the handlebar 500. Alternative embodiments are contemplated, however, in which the device only partially embraces the handlebar, for instance by comprising a clipping or clamping connection to the handlebar.

Figure 4:
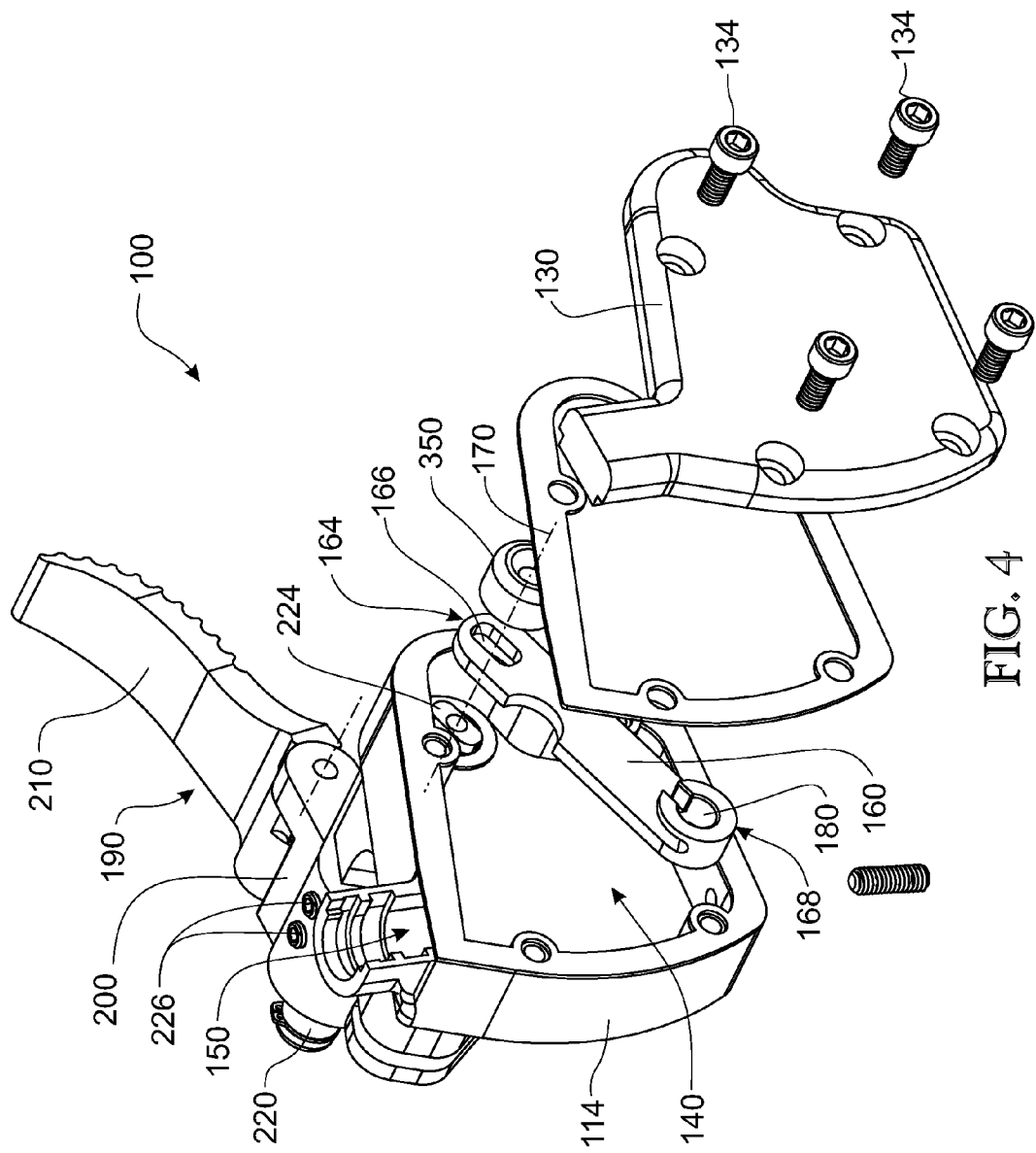
FIG. 4 presents a first exploded view of the lever device of FIG. 1, showing the inner space and the first lever assembly.

Turning again to FIGS. 1 and 2, the housing 110 of the present embodiment includes a second separable cover 130 that is attached to the main body 114 of the housing 110 by hex screws 134. The illustration of FIG. 4 shows a partially exploded perspective view of the device 100, where the second separable cover 130 is separated from the main body 114, revealing an inner space 140 delimited inside the housing 110. The housing 110 further comprises a cable opening 150, as better shown in FIGS. 1, 3 and 4, for allowing a cable to pass between the inner space 140 and the outside of the housing 110. The cable 510 is shown only in FIG. 3.

Figure 10:
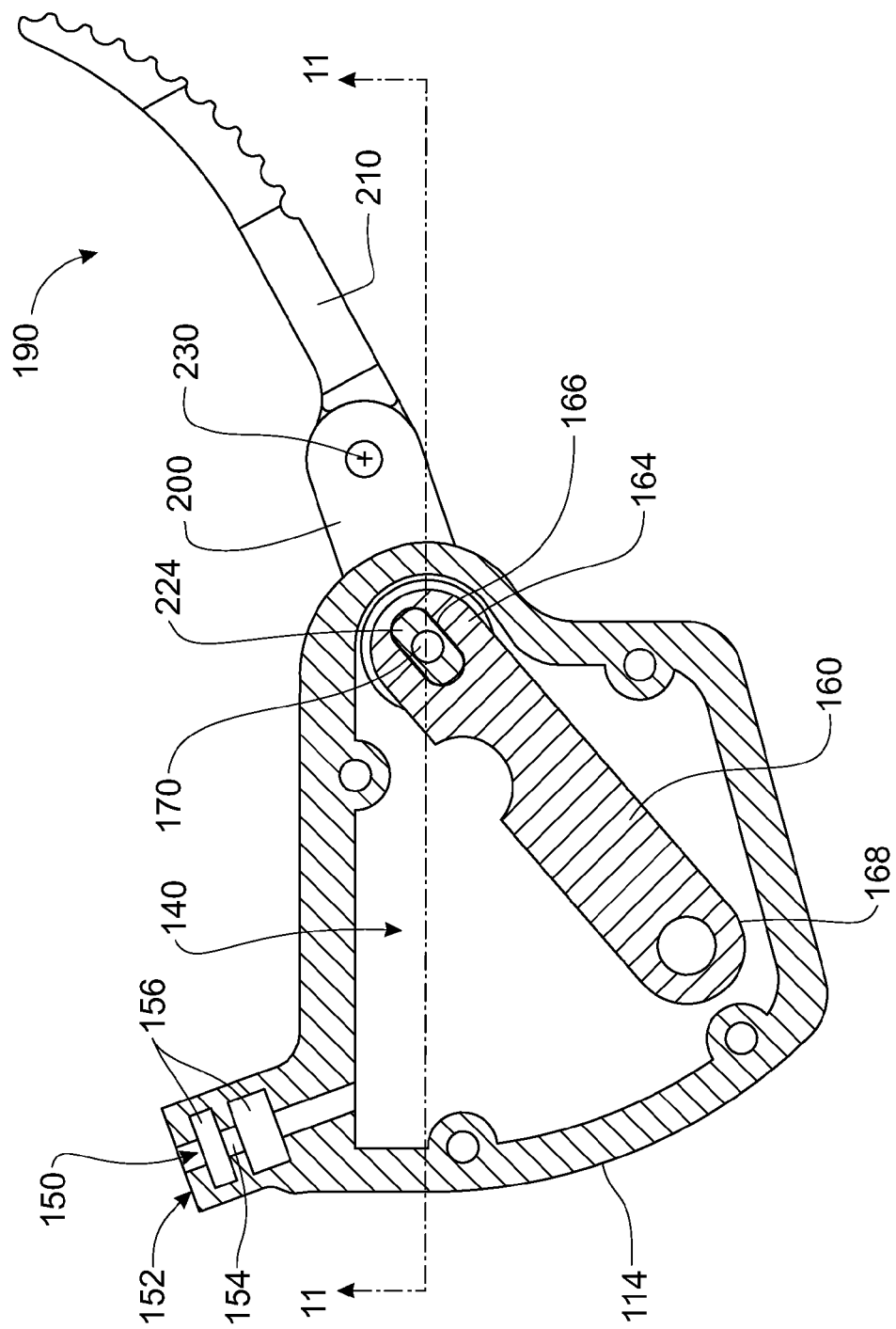
FIG. 10 presents a cross-sectional view of the lever device, according to a cross-sectional plane that is perpendicular to the first rotation axis and passes through the first lever assembly.

As best shown in FIGS. 1, 3 and 10, the cable opening 150 can be provided within a connector 152. In different embodiments of the invention, the connector 152 can optionally be provided with an internal thread, an external thread, a flange, an inward clipping protuberance, an outward clopping protuberance, or other applicable mechanical fastener or combination thereof for engaging a connector carried by the cable 510. For instance, as best shown in FIG. 10, the connector 152 of the present embodiment presents a central bore 154 and two internal wider cavities 156 for the passing through of the cable 510, and for housing and longitudinally retaining a connector carried by the cable 510.

As depicted in FIG. 4, the device 100 further comprises a first lever assembly 160 arranged in the inner space 140 of the housing 110. The first lever assembly 160 includes a hinged end 164 and a pivotable end 168. The hinged end 164 is hinged along a first rotation axis 170, allowing the first lever assembly 160 to rotate around the first rotation axis 170. The pivotable end 168, in turn, provides a fastening area 180 for connecting the cable. When the first lever assembly 160 is caused to rotate around the rotation axis 170, the pivotable end 168 pulls or releases the attached cable.

The device 100 further includes a second lever assembly 190, arranged at least partially outside of the housing 110. The second lever assembly 190 comprises a support member 200 and an extension member 210. The support member 200 is non-rotationally connected to the hinged end 164 of the first lever assembly 160. By non-rotationally connected it is understood that the support member 200 and the hinged end 164 are connected so that they to rotate jointly around the rotation axis 170. For instance, in the present embodiment, a rod 220 is non-rotationally connected to and extends through the support member 200, further extending through the main body 114 of the housing 110 and into the inner space 140, inside which a non-rotationally-symmetric end 224 of the rod 220 engages with a matching aperture 166 of the hinged end 164, as is shown in FIG. 4 and also in the cross-sectional view of FIG. 10. Such an arrangement allows rotation of the support member 200 to cause rotation of the first lever assembly 160. In turn, the extension member 210 is connected to the support member 200 and protrudes outwardly from the housing 110 so that a finger can comfortably push the extension member 210. The extension member 210 is non-rotationally connected to the support member 200 so that rotation of the extension member 210 causes a joint rotation of the support member 200 and thus, as has been explained, a rotation of the first lever assembly 160. According to the invention, the extension member 210 is lockable to the support member 200 in different rotational positions for adjusting the position of the extension member 210 with respect to the support member 200. In other words, the support member 200 and the extension member 210 can be non-rotationally connected forming different angles, allowing the angle at which the extension member 210 protrudes outwardly from the housing 110 to be varied and adapted to the user's riding or driving posture.

The non-rotational correction between the support member 200 and the rod 220 is achieved through transverse screws 226, which are radially arranged through the support member 200 and extend to the outer surface of the rod 220, not shown, slightly biting into the outer surface. Biting into the surface is enough to lock the support member 200 to the rod 220 and thus to prevent the support member 200 from moving relative to the rod 220 in any direction (i.e., neither rotationally nor longitudinally). The screws 226 can be unthreaded, allowing the user to adjust the relative rotational and/or longitudinal position between the support member 200 and the rod 220, and thus to adjust the relative position of the second lever assembly 190 relative to the main body 114. For instance, the user can slightly unthread the screws 226, pull out the support member 200 to a more comfortable position, and thread the screws 226 back in to once again lock the support member 200 to the rod 220. In an exemplary practical application, a user having a longer thumb might have to adjust the support member 200 longitudinally along the rod 220 so that the support member 200 is placed closer to the main body 114 than a user having a shorter thumb.

In the present embodiment, as shown in FIG. 3, the extension member 210 is rotatable with respect to the support member 200 relative to a second rotation axis 230 that is parallel to the first rotation axis 170. Such an arrangement provides a comfortable and intuitive adjustment of the extension member 210, as the direction in which the user must rotate the second lever assembly 190 in order to accelerate is the same as the direction in which the user must rotate the extension member 210 in order to adjust its position relative to the support member 200. Thus, if the user adjusts the rotational position of the device 100 on the handlebar 500 so that the second lever assembly 190 is comfortably reached and the user can thus comfortably accelerate the vehicle, the user will also be able to adjust the position of the extension member 210 equally comfortably.

Figure 5:
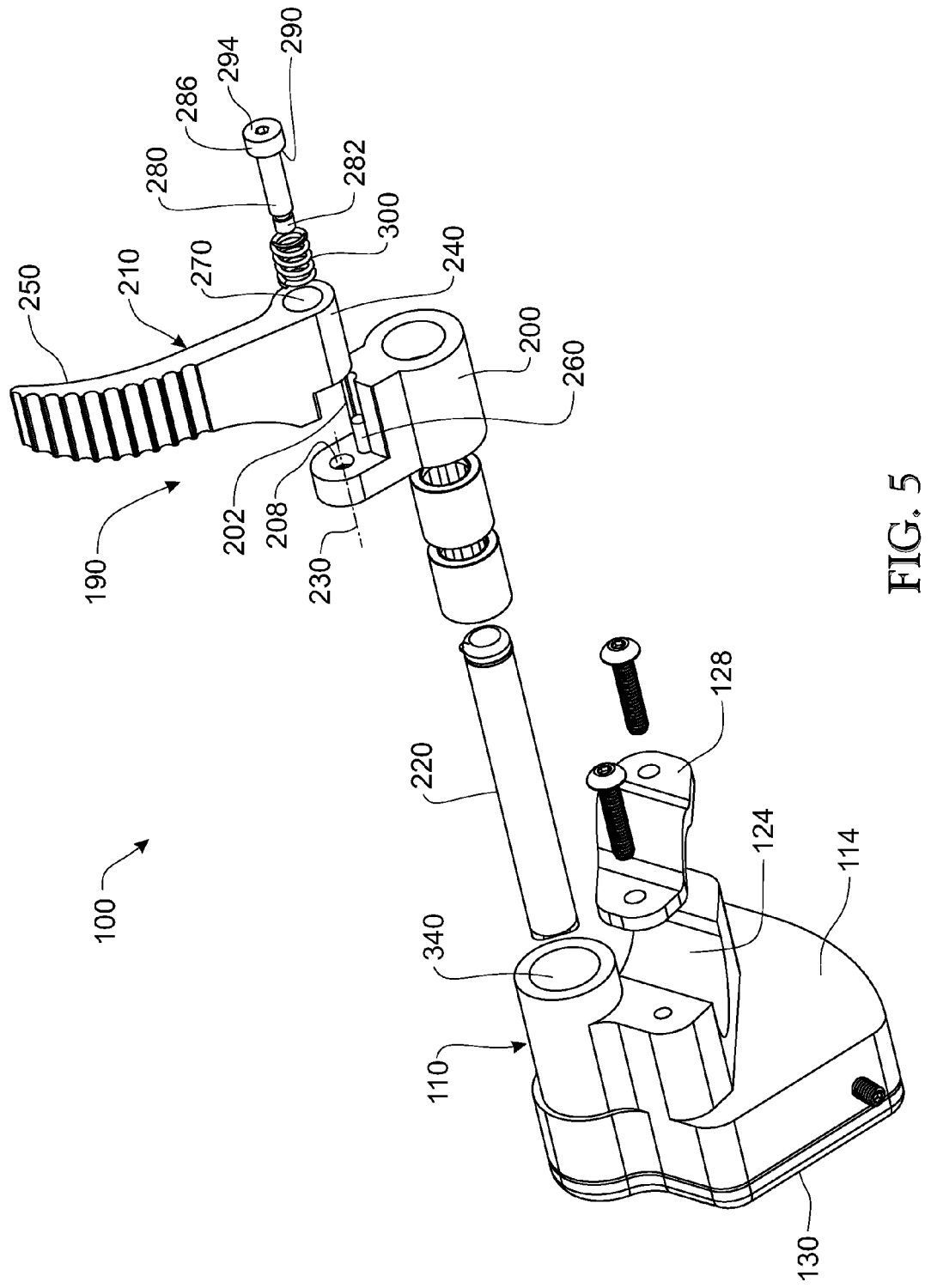
FIG. 5 presents a second exploded view of the lever device of FIG. 1, revealing the rod that connects the second lever assembly to the first lever assembly, and the components of the second lever assembly.
Figure 6:
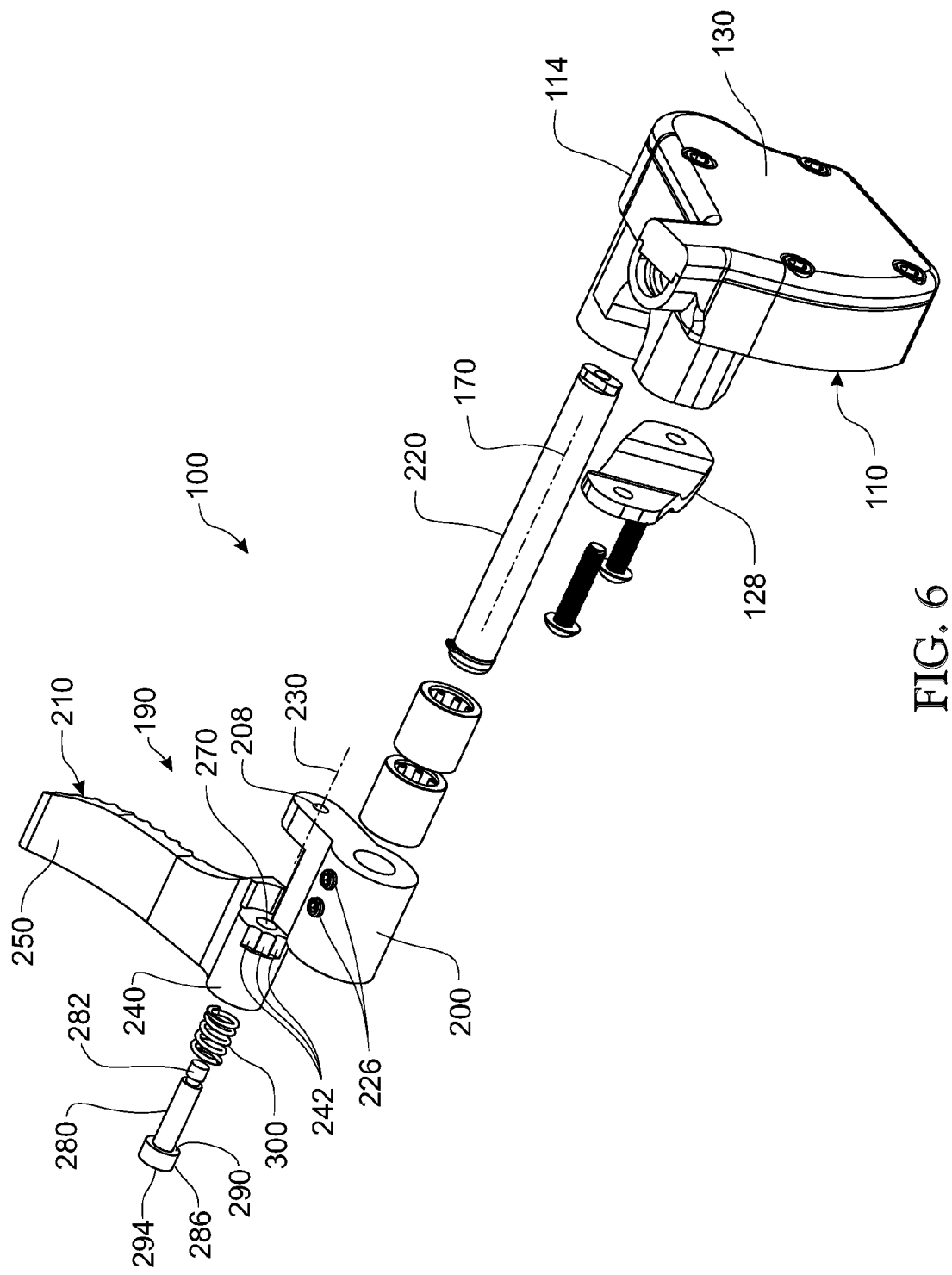
FIG. 6 presents a third exploded view, similar to that of FIG. 5 but shown from a different angle.

The illustrations of FIGS. 5 and 6 show two additional perspective views of the device 100, where the device is shown again partially exploded in order to reveal components in the area of the second lever assembly 190. As shown in the figures, the extension member 210 comprises an extension body portion 240 and an extending handle 250. The extension body portion 240 faces the support member 200 and comprises at least two pin-receiving spaces 242, shown in FIG. 6, capable of becoming alternatively aligned with a pin-receiving space 202 of the support member 200, which is shown in FIG. 5. The second lever assembly 190 further comprises a pin 260 (FIG. 5) that allows locking the extension member 210 in a determined position relative to the support member 200. For this purpose, the pin 260 is arranged inside the pin-receiving space 202 of the support member 200 and a pin-receiving space 242 of the extension body portion 240, preventing rotation of the extension member 210 with respect to the support member 200 around the second rotation axis 230.

Preferably, as shown, the pin-receiving spaces 242 of the extension body portion 240 are longitudinal cylindrical grooves, as shown in the figures. The grooves are formed on an outer surface 246 of the extension body portion 240. By longitudinal, it is understood that the cylindrical grooves are arranged so that the cylinder axes are parallel to the second rotation axis 230, i.e., to the rotation axis between the extension member 210 and the support member 200. Similarly, the pin-receiving space 202 of the support member 200 is a longitudinal cylindrical groove on an outer surface 206 of the support member 200. The pin-receiving spaces 202, 242 being cylindrical allows using a cylindrical pin 260. The pin-receiving spaces 202, 242 and the pin 260 being cylindrical in shape allows them all to be manufactured at reasonable cost.

In addition, the extension body portion 240 comprises a longitudinal through hole 270 forming a barrel hinge connection with a rod 280 that is, in turn, longitudinally coupled to the support member 200. By longitudinally coupled it is understood that the rod 280 is connected to the support member 200 and does not vary its longitudinal position in relation to the support member 200 during normal use of the device 100. A barrel hinge connection between the support member 200 and the extension body portion 240 provides a robust and durable articulated connection between the extension member 210 and the support member 200 of the second lever assembly 190.

For instance, in the present embodiment, the rod 280 is a separate member, as shown in FIGS. 5 and 6, that has a threaded portion 282. The support member 200 includes a corresponding threaded bore 208, into which the threaded portion 282 of the rod 280 is threaded, allowing the rod 280 to become longitudinally coupled to the support member 200.

Figure 7:
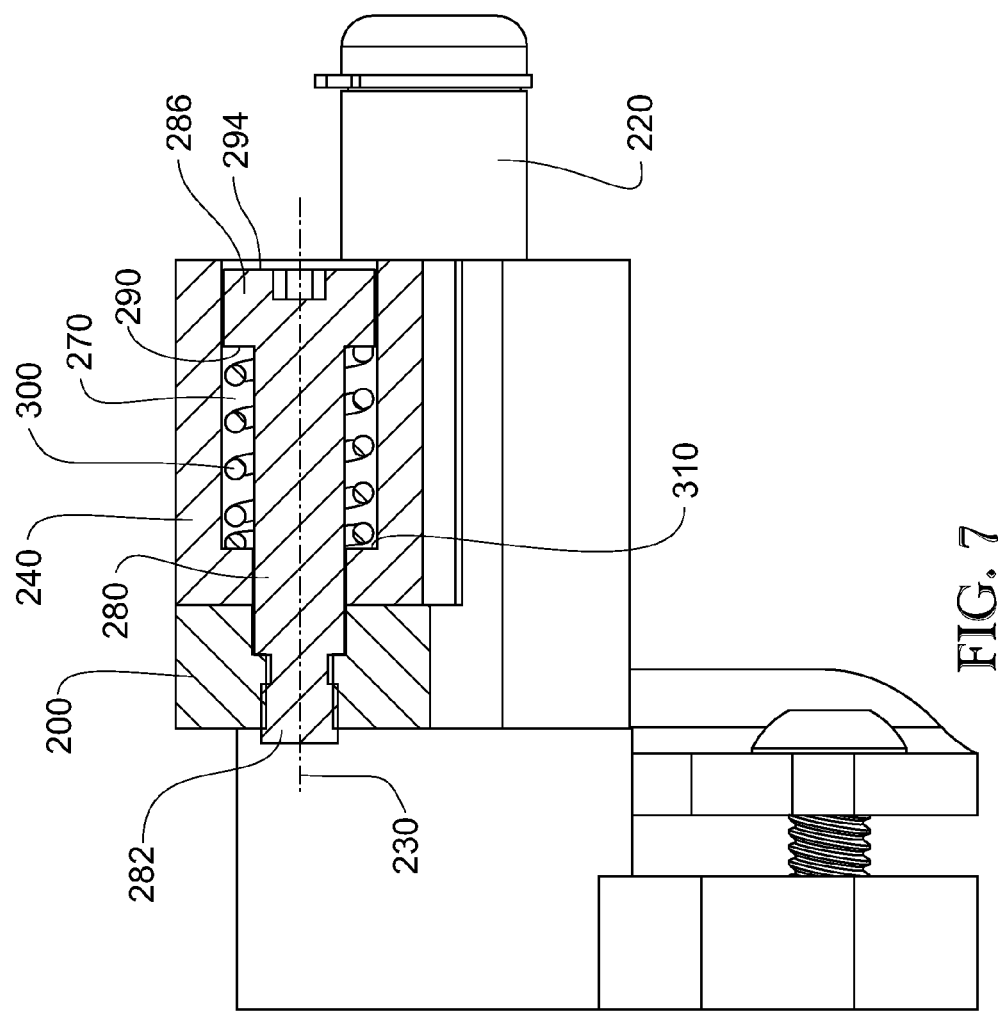
FIG. 7 presents a cross-sectional view of the second lever assembly according to a cross-sectional plane containing the second rotation axis.

In the present embodiment, the extension body portion 240 is movable with respect to the support member 200 in the direction of the second rotation axis 230. In addition, the extension body portion 240 is spring biased against the support member 200 so that the pin-receiving spaces 242 of the extension body portion 240 are biased to radially face the pin-receiving space 202 of the support member 200. Such an arrangement allows the extension member 210 to be easily unlocked, rotated and locked to the support member 200 for readjustment of the relative position of the extension member 210 and the support member 200. In the present embodiment, as best shown in FIG. 7, the rod 280 is terminated in a shoulder 286, the rod 280 and the shoulder 286 thus forming a shoulder bolt, where the shoulder 286 comprises an inner surface 290 that faces the rod 280 and an outer surface 294 opposite to the inner surface 290. The extension body portion 240 further includes a spring 300 housed in the longitudinal through hole 270 of the extension body portion 240. The spring 300 is a compression spring that is compressed between the inner surface 290 of the shoulder 286 and an opposing inner surface 310 of the extension body portion 240, and thus applies an expansion force on both surfaces 290, 310. Because the rod 280 is longitudinally coupled to the support member 200, the position of the inner surface 290 relative to the support member 200 does not vary. In consequence, the spring expansion force pushes the extension body portion 240, and thus the extension member 210, against the support member 200, to maintain the aforementioned pin lock mechanism in a locked state.

Figure 8:
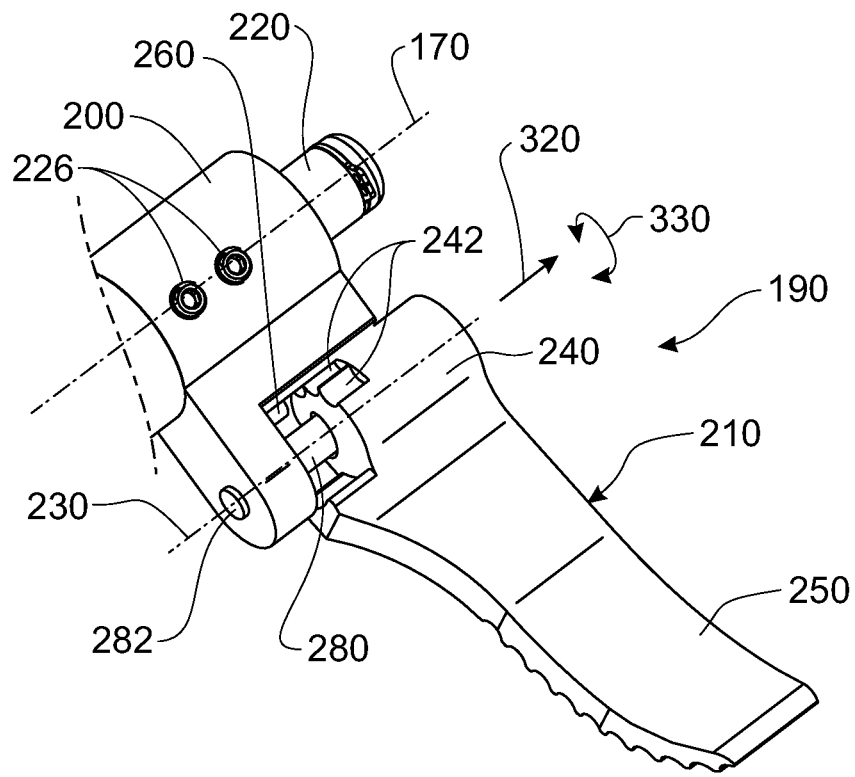
FIG. 8 presents a perspective view of the second lever assembly being unlocked to readjust the position of the extension member.
Figure 9:
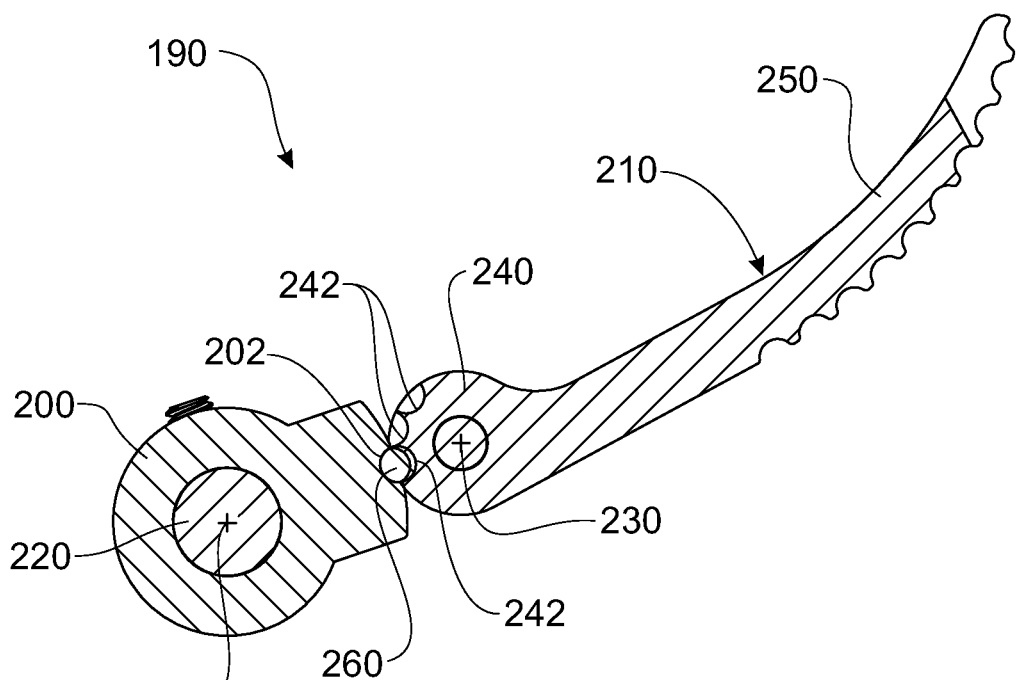
FIG. 9 presents a cross-sectional view of the second lever assembly according to a cross-sectional plane that is perpendicular to the second rotation axis.

The illustration of FIG. 8 allows for better understanding of the aforementioned pin-based locking mechanism. In normal operating conditions, the extension member 210 is biased against the support member 200 by the spring 300 (not shown) located inside the extension body portion 240, as has been explained above with reference to FIG. 7. In the normal operating conditions, the extension member 210 is rotationally locked to the support member 200 by the pin 260, as is further illustrated in the cross-sectional view of FIG. 9. Thus, when the user operates the extending handle 250 of the extension member 210, the following components rotate jointly around the first rotation axis 170: the extension member 210, the support member 200, the rod 220, and the first lever assembly 160 housed in the inner space 140 of the housing 110. Therefore, in the normal operating conditions, rotation of the extension member 210 causes the first lever assembly 160 to pull the cable. This being said, the illustration of FIG. 8 presents a situation in which, parting from the normal operating conditions, the user is readjusting the relative position of the extension member 210 and the support member 200 in order to vary the angle at which the extending handle 250 protrudes outwardly from the handlebar (for instance, in the event that the user wishes to ride in a standing position instead of in a sitting position and wishes to readjust the position of the extending handle 250 accordingly). In order to readjust, the user pulls out the extension member 210 as indicated by arrow 320 by exerting an outward force that has overcome the inward biasing force of the spring. The pin-receiving spaces 242 are moved rearwards so that the pin 260 disengages from the specific pin-receiving space 242 inside which it was engaged in the normal operating condition. In consequence, the extension member 210 is now free to rotate with respect to the support member 200 and around the second rotation axis 230, as indicated by arrow 330. The user then turns the extension member 210 to the desired new angle, and stops exerting the outward force in the direction of arrow 330. The inner spring 300 (FIG. 7) pushes the extension body portion 240, and thus the extension member 210, back towards the support member 200, causing the pin 260 to engage in a different pin-receiving space 242. The extension member 210 is thus locked in a new rotational position around the second rotation axis 230.

Figure 11:
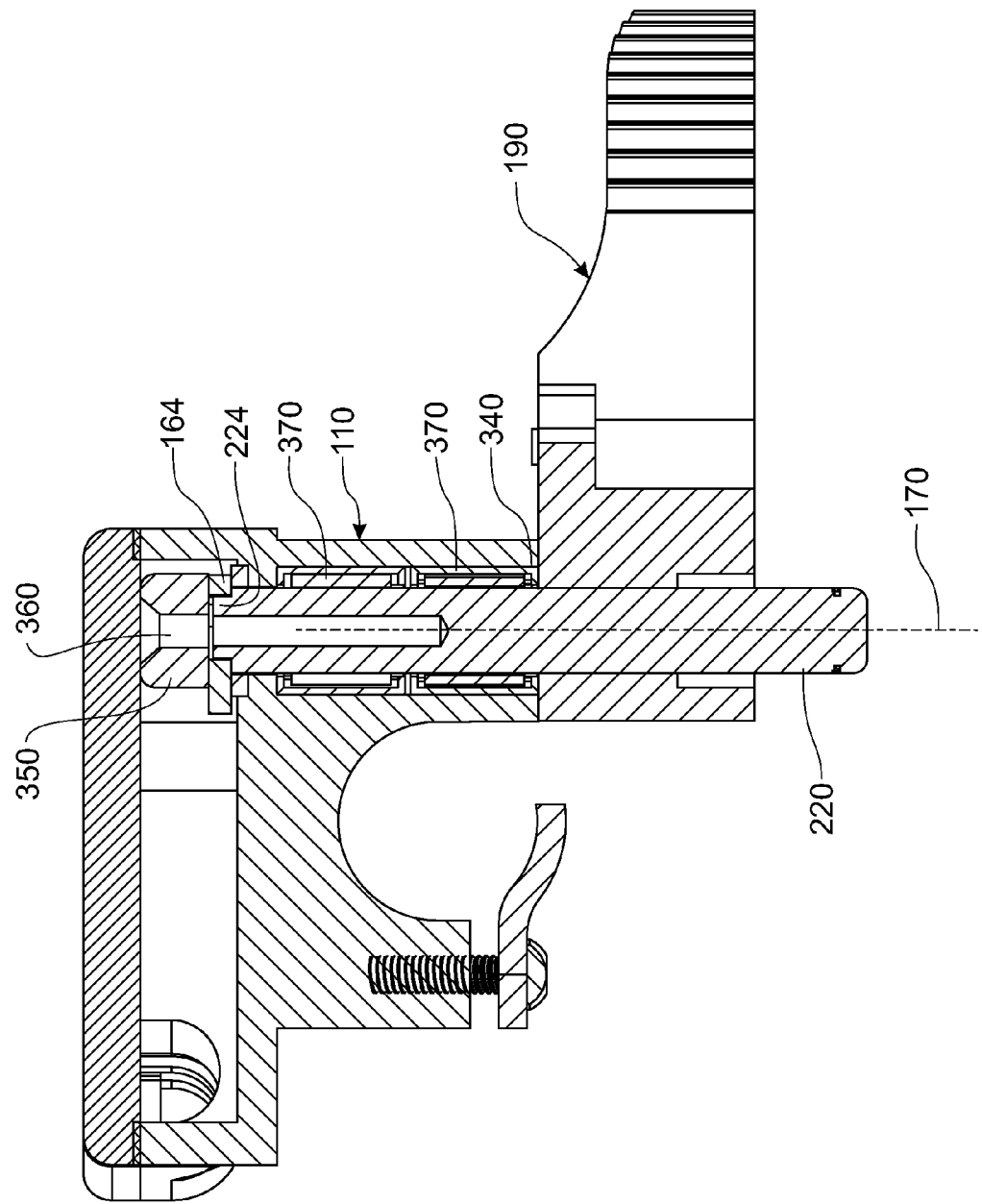
FIG. 11 shows a cross-sectional view of the lever device, according to cross-sectional plane 11-11 of FIG. 10.

In a further aspect of the invention, as shown in FIGS. 4, 5 and 11, the rod 220 that connects the second lever assembly 190 to the first lever assembly 160 extends through a through hole 340 in the housing 110. The end 224 of the rod 220 is engaged with the corresponding aperture 166 of the hinged end 164 of the first lever assembly 160, as has been explained. On the other side of the hinged end 164, a cap 350 is fixed by a screw 360, as best shown in FIG. 11, securing the rod 220 to the first lever assembly 160. The through hole 340 is provided with at least one bearing 370 to facilitate rotation of the rod 220 within the housing 110. In the embodiment shown, the device specifically comprises two needle bearings 370.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A finger-operated lever device to be installed on a vehicle handlebar for actuating a cable of a vehicle, comprising:
a housing, comprising a handlebar-receiving area for at least partially embracing a portion of the handlebar, an inner space delimited inside the housing, and a cable opening for allowing a cable to pass between said inner space and the outside of the housing;
a first lever assembly, arranged in said inner space of the housing, said first lever assembly comprising a hinged end and a pivotable end, the hinged end being hinged along a first rotation axis, and the pivotable end providing a fastening area for connecting a cable;
a second lever assembly, arranged at least partially outside of the housing and extending from said housing so that a user can operate the second lever assembly with at least one finger, wherein the second lever assembly is non-rotationally connectable to the hinged end of the first lever assembly, the second lever assembly comprising:
a support member non-rotationally connected to the hinged end of the first lever assembly; and
extension member, protruding outwardly from the housing allowing for the extension member to be operated by a user's finger, the extension member rotatable relative to the support member about a second rotation axis and lockable to the support member in different rotational positions; wherein
the extension member is movable to adopt a first position in which the extension member is locked to the support member in a specific rotational position and is spring biased to remain in said first position, and a second position in which the extension member is pulled away from the support member and is rotatable relative to the support member, and in which the extension member is spring biased towards the support member to recover the first position.

2. The lever device of claim 1, further comprising a rod extending from the second lever assembly to the hinged end of the first lever assembly, and rotationally coupled to said second lever assembly and to said hinged end so that the first lever assembly, the rod and the second lever assembly are jointly rotatable about the first rotation axis, wherein the rod extends through a through hole in the housing.

3. The lever device of claim 2, wherein said through hole is provided with at least one bearing to facilitate rotation of the rod within the through hole in the housing.

4. The lever device of claim 3, wherein the at least one bearing comprises a needle bearing.

5. The lever device of claim 1, wherein the second rotation axis is parallel to the first rotation axis.

6. The lever device of claim 1, wherein the extension member comprises an extension body portion and an extending handle, the extension body portion facing the support member and comprising at least two pin-receiving spaces capable of becoming alternately aligned with a pin-receiving space of the support member, the second lever assembly further comprising a pin arranged within the pin-receiving space of the support member and within a pin-receiving space of the extension body portion when the extension member is in the first position, preventing rotation of the extension member with respect to the support member.

7. The lever device of claim 6, wherein the pin-receiving spaces of the extension body portion comprise longitudinal cylindrical grooves on an outer surface of the extension body portion, and the pin-receiving space of the support member comprises a longitudinal cylindrical groove on an outer surface of the support member.

8. The lever device of claim 6, wherein the extension body portion is movable with respect to the support member in the direction of the second rotation axis, and the extension body portion is spring biased against the support member so that the pin-receiving spaces of the extension body portion are biased to radially face the pin-receiving space of the support member.

9. The lever device of claim 6, wherein the extension body portion comprises a longitudinal through hole forming a barrel hinge connection with a rod longitudinally coupled to the support member.

10. The lever device of claim 9, wherein the rod is threaded to the support member.

11. The lever device of claim 9, wherein the rod is terminated in a shoulder, said shoulder comprising an inner surface and an outer surface, the extension body portion including a compression spring housed in the longitudinal through hole of the extension body portion and applying a longitudinal expansion force between the inner surface of the shoulder and an opposing inner surface of the extension body portion, the expansion force biasing the extension member towards the support member.

12. The lever device of claim 1, further comprising a rod extending from the support member to the hinged end of the first lever assembly, and rotationally coupled to said support member and to said hinged end so that the first lever assembly, the rod and the support member of the second lever assembly are jointly rotatable about the first rotation axis.

13. The lever device of claim 12, wherein the support member is rotationally and longitudinally coupled to the rod by at least one transverse screw, allowing the support member to be adjusted and locked to the rod in different rotational and/or longitudinal positions.

14. A finger-operable lever device to be installed on a vehicle handlebar for actuating a cable of a vehicle, comprising:
 a housing, comprising a handlebar receiving area for at least partially embracing a portion of the handlebar, an inner space delimited inside the housing, and a cable opening for allowing a cable to pass between said inner space and the outside of the housing;
 a first lever assembly, arranged in said inner space of the housing, said first lever assembly comprising a hinged end and a pivotable end, the hinged end being hinged about a first rotation axis, and the pivotable end providing a fastening area for connecting a cable;
 a second lever assembly, arranged at least partially outside of the housing, the second lever assembly comprising:
  a support member non-rotationally connected to the hinged end of the first lever assembly; and
  extension member, protruding outwardly from the housing allowing for the extension member to be operated by a user's finger, the extension member rotatable relative to the support member about a second rotation axis and lockable to the support member in different rotational positions;
  a shoulder bolt extending along a through hole of the extension member and threaded to the support member, the shoulder bolt defining the second rotation axis; and
  a compression spring arranged between a shoulder of the shoulder bolt and an inner surface of the extension member; wherein
  the extension member is movable to adopt a first position in which the compression spring pushes against the inner surface of the extension member and maintains the extension member against the support member and locked to the support member in a specific rotational position, and a second position in which the extension member is pulled away from the support member and is rotatable relative to the support member, and in which the inner surface is closer to the shoulder of the shoulder bolt than in the first position, compressing the compression spring, and the compression pushes the inner surface to cause the extension member to recover the first position.

15. The lever device of claim 14, wherein the extension member comprises an extension body portion and an extending handle, the extension body portion facing the support member and comprising at least two pin-receiving spaces capable of becoming alternately aligned with a pin-receiving space of the support member, the second lever assembly further comprising a pin arranged within the pin-receiving space of the support member and within a pin-receiving space of the extension body portion when the extension member is in the first position for preventing rotation of the extension member with respect to the support member.

16. The lever device of claim 15, wherein the extension body portion is movable with respect to the support member in the direction of the second rotation axis, and the extension body portion is spring biased against the support member so that the pin-receiving spaces of the extension body portion are biased to radially face the pin-receiving space of the support member.

17. A finger-operated lever device to be installed on a vehicle handlebar for actuating a cable of a vehicle, comprising:
 a housing, comprising a handlebar-receiving area for at least partially embracing a portion of the handlebar, an inner space delimited inside the housing, and a cable opening for allowing a cable to pass between said inner space and the outside of the housing;
 a first lever assembly, arranged in said inner space of the housing, said first lever assembly comprising a hinged end and a pivotable end, the hinged end being hinged along a first rotation axis, and the second end providing a fastening area for connecting a cable;
 a second lever assembly, arranged at least partially outside of the housing, the second lever assembly comprising:
  a support member non-rotationally connected to the hinged end of the first lever assembly; and
  extension member, protruding outwardly from the housing allowing for the extension member to be operated by a user's finger, the extension member rotatable relative to the support member about a second rotation axis and lockable to the support member in different rotational positions; wherein the extension member is movable to adopt a first position in which the extension member is locked to the support member in a specific rotational position and is spring biased to remain in said first position, and a second position in which the extension member is pulled away from the support member and is rotatable relative to the support member, and in which the extension member is spring biased towards the support member to recover the first position; and a rod extending from the second lever assembly to the hinged end of the first lever assembly, and non-rotationally coupled to said support member of said second lever assembly and to said hinged end so that the first lever assembly, the rod and the second lever assembly are jointly rotatable about the first rotation axis, wherein the rod extends through a through hole in the housing.

18. The lever device of claim 17, wherein said through hole is provided with at least one bearing to facilitate rotation of the rod within the through hole in the housing.

19. The lever device of claim 18, wherein the at least one bearing comprises a needle bearing.

\* \* \* \* \*